(12) United States Patent
Deshmukh et al.

(10) Patent No.: US 8,316,110 B1
(45) Date of Patent: Nov. 20, 2012

(54) SYSTEM AND METHOD FOR CLUSTERING STANDALONE SERVER APPLICATIONS AND EXTENDING CLUSTER FUNCTIONALITY

(75) Inventors: Manav Deshmukh, Sunnyvale, CA (US); Kaushal Dalal, Sunnyvale, CA (US); Amol Newaskar, Pune (IN); Mangesh D. Pangarkar, Pune (IN); Vandita Mathur, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1135 days.

(21) Appl. No.: 10/739,606

(22) Filed: Dec. 18, 2003

(51) Int. Cl.
*G06F 15/177* (2006.01)
*G06F 15/16* (2006.01)

(52) U.S. Cl. .................. 709/220; 709/202; 709/221

(58) Field of Classification Search ...... 714/6; 709/201, 709/220–222
See application file for complete search history.

(56) References Cited

U.S. PATENT DOCUMENTS

| | | | | |
|---|---|---|---|---|
| 6,134,673 A * | 10/2000 | Chrabaszcz | ................. | 714/13 |
| 6,151,688 A * | 11/2000 | Wipfel et al. | .................. | 714/48 |
| 6,243,825 B1 * | 6/2001 | Gamache et al. | ................. | 714/4 |
| 6,609,213 B1 * | 8/2003 | Nguyen et al. | ................. | 714/4 |
| 6,745,241 B1 * | 6/2004 | French et al. | ................. | 709/221 |
| 7,010,717 B2 * | 3/2006 | Whitlow | ............. | 714/4 |
| 7,058,858 B2 * | 6/2006 | Wong et al. | .................... | 714/42 |
| 7,069,270 B1 * | 6/2006 | Kumar | ................................ | 1/1 |
| 7,080,378 B1 * | 7/2006 | Noland et al. | ................. | 718/104 |
| 2003/0018927 A1 * | 1/2003 | Gadir et al. | ........................ | 714/4 |
| 2003/0126240 A1 * | 7/2003 | Vosseler | ........................ | 709/221 |
| 2003/0177206 A1 * | 9/2003 | Whitlow | ....................... | 709/220 |
| 2004/0267911 A1 * | 12/2004 | Alam | .......................... | 709/220 |
| 2005/0108593 A1 * | 5/2005 | Purushothaman et al. | ....... | 714/4 |

OTHER PUBLICATIONS

"Windows NT Clustering Service" Gamache, R. Short, R. Massa, M. Oct. 1998 IEEE Computer. vol. 31, Issue: 10. pp. 55-62.*
"A Highly Available Network File Server" Bhide, A. Elnozahy, E. Morgan, S. 1991 in Proceedings of the Winter USENIX Conference.*
VMware P2V Assistant 1.0 User's Manual, Version 1.0, Published: Aug. 27, 2003 http://www.vmware.com/support/pubs/p2v_pubs.html.*
Dylan Miller and Jon Hoerlein, "Deploying Microsoft Exchange 2000 Server Clusters," Microsoft Exchange 2000 Server, Published Jul. 2001, Updated May 2002, Jul. 2002, Nov. 2002. Applies to Exchange 2000 Server SP3.

* cited by examiner

*Primary Examiner* — Kenny Lin
*Assistant Examiner* — Noel Beharry
(74) *Attorney, Agent, or Firm* — Campbell Stephenson LLP

(57) ABSTRACT

Systems, methods, apparatus and software can implement clusterizing processes on existing standalone server application installations. A server computer system on which a server application resides is renamed from its original name. Cluster software is installed on the server computer system. A virtual server is created to represent the server application to client applications and users. The virtual server is given the original server computer system name and can also be given the server computer system's network address. Cluster functionality can further be extended to allow a virtual server to failover to any other node available in a cluster.

31 Claims, 7 Drawing Sheets

SYSTEM AND METHOD FOR CLUSTERING STANDALONE SERVER APPLICATIONS AND EXTENDING CLUSTER FUNCTIONALITY

FIELD OF THE INVENTION

The present invention relates to distributed computer systems and, more particularly, to accommodating various applications in clustered computer systems.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability situations. For applications that require the computer system to be highly available, e.g., the ability to maintain the system while still providing services to system users, a cluster of computer systems is a useful implementation of the distributed computing model. In the most general sense, a cluster is a distributed computer system that works together as a single entity to cooperatively provide processing power and mass storage resources. With a cluster, the processing load of the computer system is typically spread over more than one computer, thereby eliminating single points of failure. Consequently, programs executing on the cluster can continue to function despite a problem with one computer in the cluster. In another example, one or more computers of the cluster can be ready for use in the event that another computer in the cluster fails. While each computer in a cluster typically executes an independent instance of an operating system, additional clustering software is executed on each computer in the cluster to facilitate communication and desired cluster behavior.

FIG. 1 illustrates a simplified example of a computing system 100 that is not operating as a cluster. The members of the computing system 100 include host 130 and host 140. As members of computing system 100, hosts 130 and 140, are typically individual computer systems having some or all of the software and hardware components illustrated. For example, hosts 130 and 140 operate as servers and as such include well known hardware and software components such as: file system software, storage virtualization software (volume management software), an operating system, various drivers for the server's hardware, and platform hardware such as various interface devices. As servers, hosts 130 and 140 also include server applications (132 and 142) such as communication and collaboration servers (e.g., e-mail servers), web servers, file servers, database management systems (DBMS), media servers, enterprise application servers, and the like. When operating on a server computer system, such server applications typically utilize some amount of local storage (134 and 144) for server application configuration information, software components, operational information, and data. FIG. 7 (described below) illustrates some of the features common to such computer systems, and those having ordinary skill in the art will understand the wide variation in hardware and software components of such systems.

In support of various applications and operations, hosts 130 and 140 can exchange data over, for example, network 120, typically a local area network (LAN), e.g., an enterprise-wide intranet, or a wide area network (WAN) such as the Internet. Additionally, network 120 provides a communication path for various client computer systems 110 to communicate with hosts 130 and 140. In addition to network 120, hosts 130 and 140 can communicate with each other over a private network (not shown).

Other elements of computing system 100 include storage area network (SAN) 150 and storage devices such as tape library 160 (typically including one or more tape drives), a group of disk drives 170 (i.e., "just a bunch of disks" or "JBOD"), and intelligent storage array 180. As shown in FIG. 1, both hosts 130 and 140 are coupled to SAN 150. Such coupling can be through single or multiple paths. SAN 150 is conventionally a high-speed network that allows the establishment of direct connections between storage devices 160, 170, and 180 and hosts 130 and 140. SAN 150 can be implemented using a variety of different technologies including SCSI, fibre channel arbitrated loop (FCAL), fibre channel switched fabric, IP networks (e.g., iSCSI), Infiniband, etc. SAN 150 can also include one or more SAN specific devices such as SAN switches, SAN routers, SAN hubs, or some type of storage appliance. Thus, SAN 150 is shared between the hosts and allows for the sharing of storage devices between the hosts to provide greater availability and reliability of storage. Although hosts 130 and 140 are shown connected to storage devices 160, 170, and 180 through SAN 150, this need not be the case. Shared resources can be directly connected to some or all of the hosts in the computing system, and computing system 100 need not include a SAN. Other storage schemes include the use of shared direct-attached storage (DAS) over shared SCSI buses. Alternatively, hosts 130 and 140 can be connected to multiple SANs.

Hosts 130 and 140 can be designed to operate completely independently of each other as shown, or may interoperate to form some manner of cluster. As members of a cluster, servers or hosts are often referred to as "nodes." Thus, a node in a computer cluster is typically an individual computer system having some or all of the software and hardware components illustrated and as is well known in the art.

In order to operate servers such as servers 130 and 140 as a cluster, both the underlying system software (e.g., operating system, file system, volume management, server-to-server communication) and any server applications operating on the servers must be designed and/or configured to operate in a cluster. Installing such systems typically occurs from the ground up, i.e., first basic system software is installed, then system software needed to support clustering operations, and finally cluster aware and/or compatible server application software is installed. In many cases, cluster aware and/or compatible server application software is specifically designed to operate only in particular (typically proprietary) cluster environments. For example, Microsoft Exchange 2000 Server (a common e-mail server application) is designed to support cluster operation only in conjunction with clustering services provided by the Microsoft Windows 2000 Server operating system.

However, there are many instances where it is desirable to transform an existing standalone server application installation (such as those illustrated in FIG. 1) into a clustered installation. The primary advantage to such a transformation is that it obviates the need to undergo the laborious process of saving application data and configuration information, uninstalling the server application, upgrading/reinstalling/activating clustering system software, reinstalling the server application, and reconfiguring the server application. Moreover, it is desirable to be able to implement such server applications in clustering environments for which they were not necessarily designed and to extend to these server applications clustering functionality which might not otherwise be available in the clustering systems with which they have been designed to operate.

SUMMARY OF THE INVENTION

It has been discovered that systems, methods, apparatus and software can implement clusterizing processes on existing standalone server application installations. A server computer system on which a server application resides is renamed from its original name. Cluster software is installed on the server computer system. A virtual server is created to represent the server application to client applications and users. The virtual server is given the original server computer system name and can also be given the server computer system's network address. Cluster functionality can further be extended to allow a virtual server to failover to any other node available in a cluster.

Accordingly, one aspect of the present invention provides a method. A server computer system is provided having a first name, wherein the server computer system includes a server application installed on the server computer system. The first name of the server computer system is changed to a second name. Cluster software is installed on the server computer system. The cluster software is configured to allow the server computer system to operate as a node of a computer system cluster. A virtual server associated with the server application is created. The first name is assigned as a virtual server name.

In another aspect of the present invention, a system includes a memory, a processor coupled to the memory, and a local storage device coupled to the processor. A server application is stored on the local storage device. The computer system also includes clusterizing software configured to: change the first name of the computer system to a second name; create a virtual server associated with the server application; and assign the first name as a virtual server name. At least a portion of at least one of the server application and the clusterizing software is encoded as instructions stored in the memory and executable on the processor.

In another aspect of the present invention, a computer readable medium includes program instructions executable on a processor. The computer readable medium is at least one of an electronic storage medium, a magnetic storage medium, an optical storage medium, and a communications medium conveying signals encoding the instructions. The program instructions are operable to implement each of: changing a first name of a server computer system to a second name, wherein the server computer system includes a server application installed on the server computer system; creating a virtual server associated with the server application; and assigning the first name as a virtual server name.

Yet another aspect of the present invention provides an apparatus including: a means for changing a first name of a server computer system to a second name, wherein the server computer system includes a server application installed on the server computer system; a means for installing cluster software on the server computer system, wherein the cluster software is configured to allow the server computer system to operate as a node of a computer system cluster; a means for creating a virtual server associated with the server application; and a means for assigning the first name as a virtual server name.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 2:
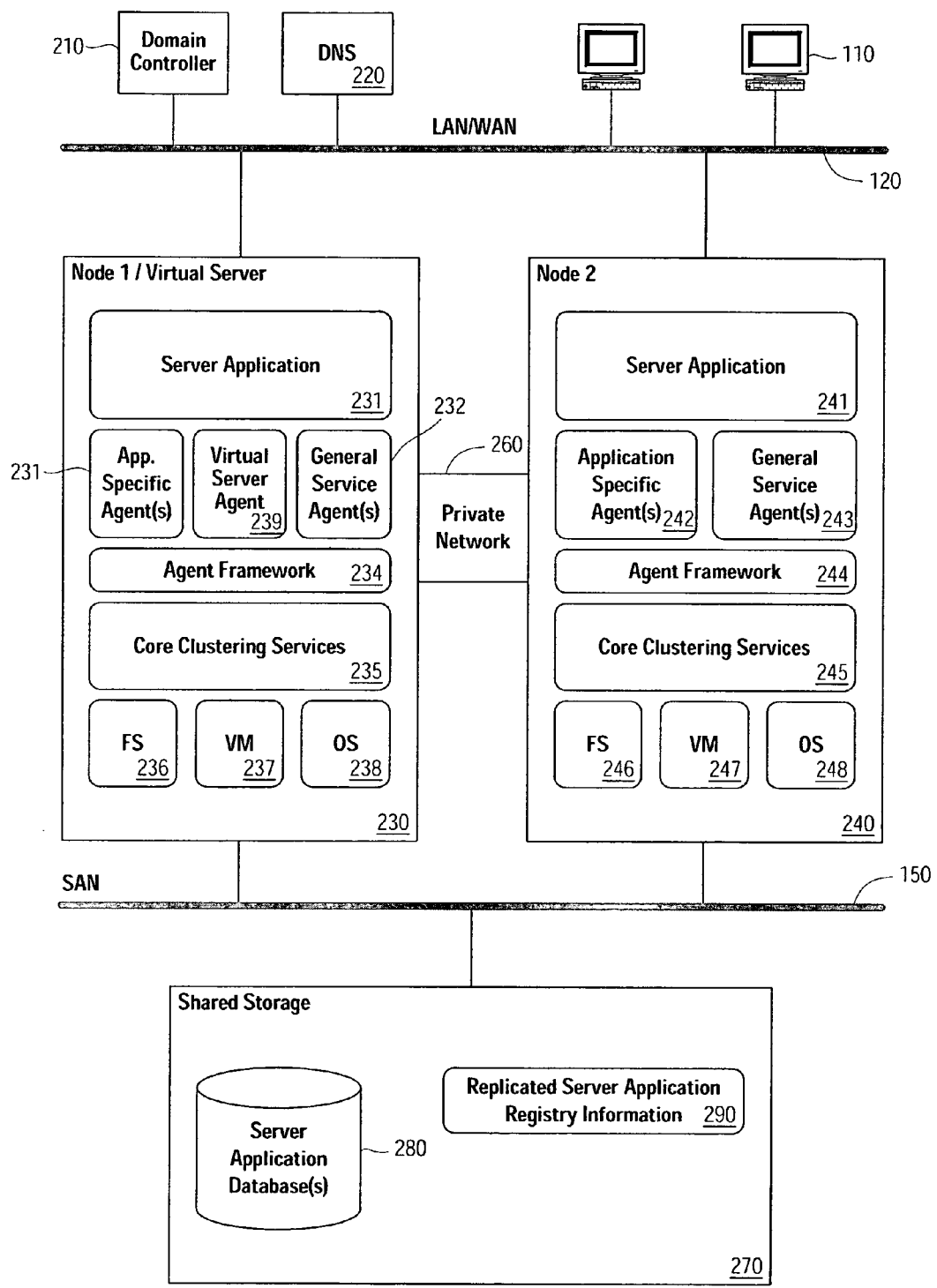
FIG. 2 is a simplified block diagram of a clustered computing system utilizing some of the systems and methods of the present invention.

FIG. 2 illustrates a simplified block diagram of a clustered computing system 200 utilizing some of the systems and methods of the present invention. In the example of FIG. 2, clustered computing system 200 includes two cluster nodes 230 and 240. The cluster nodes have access to shared storage 270, which can be one or more of the above described storage devices and can be interfaced with the nodes through a variety of techniques including the use of SAN 150. Each cluster node includes typical computer system software such as a operating system (238 and 248), a volume manager (237 and 247), and a file system (236 and 246). Because servers 230 and 240 are operating as cluster nodes, this system software can include functionality specifically for clustered operation. In addition to the basic system software, there is software to provide core clustering services (235 and 245). One example of such software is the software provided in the VERITAS Cluster Server™ (VCS) products from VERITAS Software Corporation. Other cluster service software environments will be well known to those having ordinary skill in the art.

Core clustering services 235 and 245 typically provide both the processes that operate on a particular node to perform clustering functions and communications services so that nodes can communicate and thereby operate in the desired cluster configuration. Cluster communications services ensure that each node is continuously aware of the status of each other node's services and resources. They also enable a node to recognize which other computer systems are active members of a cluster, which are joining or leaving a cluster, and which have failed.

In the example of a VCS cluster implementation, core clustering services (235 and 245) would include a primary process or high availability daemon (HAD) running on each node of the cluster. This process receives information from various other software entities, e.g., kernel processes, user applications such as command-line interface (CLI) and graphical user interface (GUI) tools, drivers, utilities, and agents (232, 233, 242, and 243), regarding resources on the local system and forwards the information to each member of the cluster. The HAD also receives information from other cluster members, which it uses to update a local description of the entire cluster. Communication between the primary cluster processes on different cluster nodes occurs through kernel level processes known as the group membership services/atomic broadcast protocol (GAB) and the low latency transport (LLT).

GAB is a mechanism for monitoring cluster memberships, tracking cluster state, and distributing the information to cluster systems. For example, cluster membership can be defined as all systems configured with the same cluster ID and interconnected via a private network 260. As shown, private network 260 is only accessible by cluster nodes, i.e., servers 230 and 240. To support the high availability of cluster 200, private network 260 typically includes redundancy such as two network paths instead of one. Private network 260 is used by the nodes for cluster service message passing including, for example, the exchange of so-called "heart-beat" signals indicating that each node is currently available to the cluster and functioning properly. Similar functions can be implemented using a public network. During standard operation, all systems configured as part of the cluster during system installation are actively participating in cluster communications. Cluster membership enables each node to dynamically track the entire cluster topology. GAB also provides state information about the resources of one node to all other cluster nodes. Atomic broadcast ensures all systems within the cluster are immediately notified of changes in resource status, cluster membership, and configuration.

LLT is the mechanism that provides actual communications between systems in a cluster. Specifically, it provides fast, kernel-to-kernel communications, provides the aforementioned heartbeat signals, and monitors private network connections. LLT provides a replacement for other types of communication protocols, e.g., IP, and is specifically designed to ensure that events such as state changes are reflected among cluster nodes in a timely manner.

The various agents (e.g., application specific agents (232 and 242) and general service agents (233 and 243) of the core clustering services 235 and 245 are programs designed to control resources of a particular resource type. In general, a resource is any hardware or software entity, e.g., network interface cards, IP addresses, applications, etc., that can be brought online, taken offline of monitored by the clustering services. For example, one agent can be in charge of monitoring all IP resources on a node. In another example, the agent is specific to a particular application running on the server (231 and 241) such as a DBMS or an e-mail server. Agents can control resources according to information hard coded into the agent itself, or by running scripts. Thus, agents act as the intermediary (via agent framework 234 and 244) between resources and the core clustering services, and provide flexibility for implementing clusters using a variety of different resources. An agent typically recognizes the requirements of its corresponding resource and communicates them to the core clustering services. For example, to bring a DBMS resource online, core cluster services 235 does not need to understand the language or commands of the DBMS; it simply passes the online command to the DBMS agent, which, in turn, knows to issue the appropriate startup command. Agents are also used to monitor resources for failure, to try to restart a failed resource prior to declaring it faulted, and to inform the core clustering services when a resource has failed.

In addition to the above described clustering software elements, core clustering services 235 and 245 can support or implement a variety of features, data structures, and organizational concepts for use in maintaining a cluster. One such example is a service group. A service group is a collection of resources working together to provide application services to clients. It typically includes multiple resources, hardware and software based, working together to produce a single service. For example, a database service group may include a logical network (IP) address, the DBMS software, underlying file systems, logical volumes, and a set of physical disks managed by a volume manager. If a service group migrates to another node for recovery purposes, all of the service group's resources migrate together to recreate the group on another node, without affecting other service groups. A single node may host several service groups, each providing a discrete service to networked clients. In that case, service groups are typically monitored and managed independently. Independent management enables a service group to be recovered automatically or idled manually (for administrative or maintenance reasons) without affecting other service groups running on the node. Thus, a virtual server is typically maintained in this type of clustering environment as part of one service group.

As noted above, the clustering architecture described herein is merely one example of the type of clustering architecture with which the present systems and methods can be used. For example, in some implementations, some or all of the agent functionality may be integrated with the core clustering services. In still other examples, clustering services are part of a computer system's operating system. Other variations are well known to those having ordinary skill in the art.

Since the server application or applications that are desired to be used in a clustered environment may be designed for different clustering systems and may not be designed to be converted from a regular server implementation to a clustered implementation, care must be taken in implementing systems and techniques to migrate such server applications to clusters and to extend to the server application cluster features not originally intended by the server application's developer. The starting point for such implementations is an understanding of how the server application was originally intended by its developer to be presented in a cluster environment.

Many server applications are made available to cluster users or client applications as application virtual servers. One example of such a server application is the aforementioned Exchange 2000 Server from Microsoft Corporation. Note that in many of the examples described below, reference will be made to features and characteristics of Exchange 2000 Server and its implementation in a clustered environment. Exchange 2000 Server is merely one example of the type of server application for which the presently disclosed systems and methods can be used.

In general, a virtual server is a highly scalable and highly available server built on a cluster of "real" servers. The architecture of the cluster is transparent to end users or client applications which see only a single virtual server. Node 230 of the example cluster system 200 in FIG. 2 is also shown as being a virtual server. In this example, software providing certain virtual server functionality, e.g., functionality other than the server application itself, is provided within the aforementioned agent framework as virtual server agent 239. In this manner, the virtual server can be controlled and treated in much the same way as any other agent. In other embodiments, virtual server functionality can be provided outside the cluster agent framework. Although not shown, a virtual server agent may also exist in node 240. For example, the agent can be installed and ready to assume duties upon failover. Other network entities such as domain controller 210 and domain name server 220, are typically aware of the virtual servers. To users and clients, connecting to an application or service running as a clustered virtual server appears to be the same process as connecting to a single, physical server. The user or client application typically does not know which node of a cluster is actually hosting the virtual server. The real servers may be interconnected by high-speed LAN or by geographically dispersed WAN, and may implement any of a variety of cluster configurations such as failover configurations or parallel service configurations. Scalability of the virtual server can be achieved by transparently adding or removing a node in the cluster. In some implementations, multiple virtual servers (particularly where each virtual server represents a different application rather than multiple virtual servers running the same application) can exist on a single node.

In a typical implementation, clustering services (with the assistance of an appropriate agent) manage the virtual server as another resource or resource group, with each virtual server having a virtual IP address and a virtual network name (virtual server name) that is mapped to the virtual IP address. Application client connections to a virtual server are made by a client session that knows only the virtual IP address that is published as the address of the virtual server. Thus, the client view is simply a view of individual network names and IP addresses. In the event of an application or server failure, clustering services move the entire virtual server resource to another node in the cluster. When such a failure occurs, a client will detect a failure in its session with the application and attempt to reconnect in exactly the same manner as the original connection. It will be able to do this successfully, because the clustering services map the published virtual IP address of the virtual server to another node in the cluster. The client session can reestablish the connection to the application without needing to know that the application is now physically hosted on a different node in the cluster.

To support the ability to failover a virtual server, important server application information needs to be accessible to other nodes of the cluster. In the example of FIG. 2, this is accomplished by locating server application information such as database(s) 280 and application registry information 290 on shared storage 270. In some cases, certain information can also be passed to other nodes or to the shared storage at the time failure of the virtual server or its corresponding node is detected.

Figure 3:
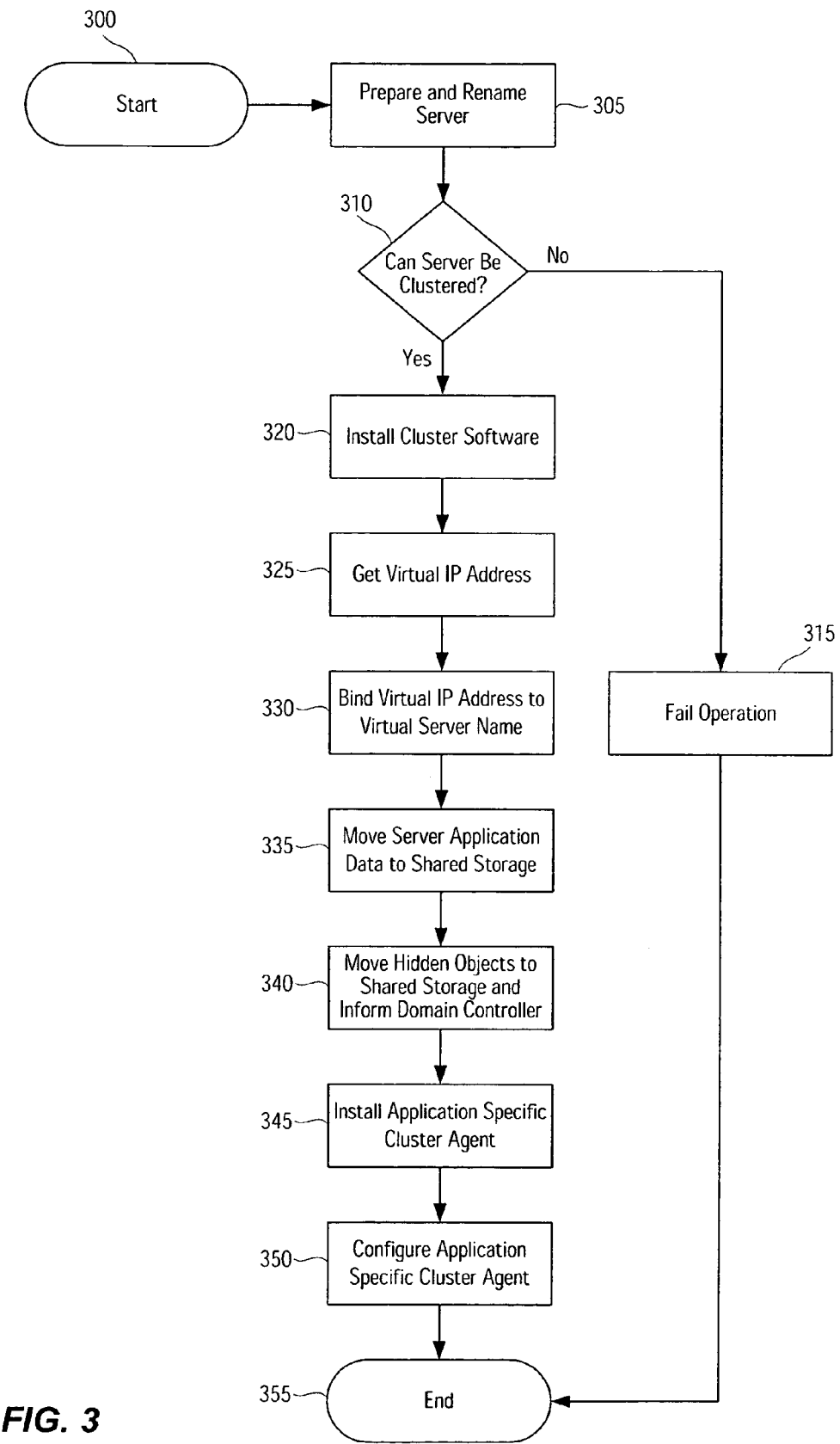
FIG. 3 is a flow chart illustrating techniques of the present invention.

While such virtual servers are often configured contemporaneously with the installation of a server application, FIG. 3 illustrates a process where an existing standalone installation of a server application can be converted for use in a cluster. Operation of the process to "clusterize" an existing installation of a server application (and the server on which the server application resides) begins at 300. At this point, there are typically no clustering services on the server, or clustering services are not activated. In step 305, the server and the server application are prepared for the clusterizing process. This preparation typically includes shutting down server application services, disabling automatic startup of some or all server application services, backing up information stored on the server, and the like. Since operation of the server application will utilize a corresponding virtual server, this process utilizes the server's current name (before it has been clusterized) as the virtual server name. Consequently, the server is also renamed in 305, where it is typically given a name indicating in some manner that it will be part of a cluster. Additionally, if the server's current IP address is desired to be used as the IP address of the virtual server, i.e., a virtual IP address, or if it is otherwise desired to change the server's IP address, that operation can also be preformed at this time.

The server is then examined to determine whether it can in fact be made part of a cluster. This examination typically includes: examining the server computer system for requisite hardware (e.g., redundant host bus adapters, network interface cards for a private network, adequate storage, etc.), determining if the existing system software is compatible with the clustering software, and the like. If it is determined that the server computer system cannot be used in a cluster, the operation fails 315 (typically with some error indication) and terminates at 355. If instead it is determined that the server computer system can be used in a cluster, then operation transitions to 320 where the cluster software is installed. In general, the process of installing requisite cluster software such as, for example, core clustering services 235 and general service agents 233, will vary greatly depending on the particular clustering system used and is thus beyond the scope of the present application.

As noted in connection with FIG. 2, the core clustering services of a cluster node may use an application specific agent to manage the server application as a cluster resource. Consequently, some of the operations discussed below may be performed either by an application specific agent, or as part of the process of installing and/or configuring such an agent. Moreover, since the server application will make use of certain cluster resources, e.g., shared storage, some or all of those resources may have to be made available before certain operations can proceed. For example, if the server application will need to use the shared storage to store information specific to the server application, the shared storage may need to be made available, e.g., mounting volumes or partitions on the shared storage.

Once the server computer system has been made ready for cluster operation generally, the server application is configured for cluster operation. As noted above, the server application may not be specifically designed for operation in the chosen cluster environment. Moreover, the server application may best operate with other entities in the environment, e.g., users, client applications, domain controllers, domain name servers, etc., under the identity of the server application's initial installation. Consequently, the process of configuring the server application for cluster operation will involve establishing a virtual server based on the original identity of the server on which the server application resided. In step 325, a virtual IP address is obtained for the virtual server. As noted above, this can be the original IP address of the server computer system, or it can be a new (unique) virtual IP address. This operation can also include other communications related steps, such as selection of network adapters to be used, subnet mask determination, etc.

The process transitions to 330 where the virtual IP address and the virtual server name, i.e., the original name of the server, are bound together and provided to appropriate cluster system entities such as the node itself, domain controllers, and domain name servers. Since one goal of a clustered implementation of a server application is to allow that server application to failover to another node in the cluster, the clusterizing process also ensures that relevant data and objects are accessible to nodes that might assume operation of the server application. The most obvious example of such information is the data regularly used by the server application. Where the server application is the aforementioned Exchange 2000 Server, information such as transaction log files, the public store files, and mailbox store files must be made accessible to all nodes that will be configured to operate the corresponding virtual server. Consequently, server application data is moved to shared storage 335. The data movement process can involve other information, either additional information that needs to be moved, or information that should be consulted as part of the movement process. For example, metadata stored in the domain controller may need to be examined. Since the existing data was generated by the server application before the clusterizing process began, i.e., when the server application operated as a standalone server, the data to be moved typically resides on local storage. The process of moving this data may be as simple as executing operating system level file copy commands. In some embodiments, utilities specific to the server application exist to ensure that movement of such files is performed in a way that does not diminish their usability.

In addition to information such as the databases used in conjunction with the server application, other relevant server application information may need to be replicated onto shared storage. For example, in the Microsoft Windows 2000 environment, a database called the registry is used to store settings, options, and information about the hardware, software, users, and preferences of the computer system. Registry information corresponding to a server application can include vital information (e.g., checksum, security, application service information, etc.) needed for the operation of the virtual server on whatever node it operates. Consequently, step 335 and/or step 340 (described below) may include operations to duplicate such information and make it available to failover nodes.

Certain hidden objects can also be relocated to shared storage (340). For example, a typical domain controller implementation in the Windows 2000 environment utilizes the Active Directory service. In that context, Active Directory uses objects, which are the entities that make up a network. Such an object is a distinct, named set of attributes that represents something concrete, such as a user, a printer, or an application. When an Active Directory object is created, Active Directory generates values for some of the object's attributes, while others are provided by the user or application that created the object. Thus, the server application that is the subject of the clusterizing operation typically has one or more associated objects. Again, to support the ability of the virtual server to operate on any designated node of the cluster, certain objects should be duplicated and or moved to a location where they can be used by different nodes. In some cases, such an operation also necessitates informing the domain controller. Step 340 may also include moving data for which there is no existing specialized utility, but for which care must be taken none the less. In the example where the server application is Exchange 2000 Server, such data might include the message transfer agent data. Still other examples will be well known to those having skill in the art.

Next, the application specific agent itself is installed (345) on the server computer system and configured (350). Although many of the details of application agent installation and configuration are beyond the scope of this application, several specific details are discussed below in relation to FIGS. 5 and 6. Moreover, some clustering system implementations may not utilize agents (as described above), and so in those environments there may be no explicit agent installation step. Similarly, agent configuration may be replaced by configurations operations targeting clustering functionality that supports server applications generally, specific types of server applications, and/or specific server applications. The process terminates at 355. Either immediately before 355, as part of 355 or immediately after 355, the virtual server is made part of a cluster service group. Similar steps may need to be repeated for the configuration of other nodes. In still other examples, other nodes can be configured in a more conventional manner, i.e., install and configure cluster software first, and then install and configure the appropriate server application and agents. In general, the same virtual server name and virtual IP address will be used to install and/or configure the server application on other nodes. Once complete, the server application can be restarted operating as a virtual server that is ready for failover to other nodes as necessary. Thus, by using the initial identification of the server as the virtual server identification and relocating data as necessary, an existing standalone server application can be brought into a clustered environment.

Just as it is useful to extend clustering functionality to applications that are already installed, thereby avoiding most of the disadvantages of having to reinstall the application in a clustered environment, it is further useful to extend the cluster features supported by applications. Many server applications support a limited set of cluster operations when used in the clustering system for which they are designed. For example, Microsoft Exchange 2000 Server is designed for use with clustering functionality provided by the Microsoft Windows 2000 Advanced Server and Datacenter Server products. However, when used as intended there are significant limitations to the cluster operation of Exchange 2000 Server. In the case of Windows 2000 Advanced Server, only a two node cluster is supported for use with Exchange 2000 Server and those configurations are limited to active/passive (where a primary node operates the virtual server and a secondary dedicated node is used only when failover occurs on the primary node) and active/active (where both nodes are active and failover requires the surviving node to take on processing operations for both nodes). In the case of Microsoft Windows 2000 and Datacenter Server, the cluster is limited to four nodes with severe restrictions on which nodes can be "active" which can be "passive".

Figure 4:
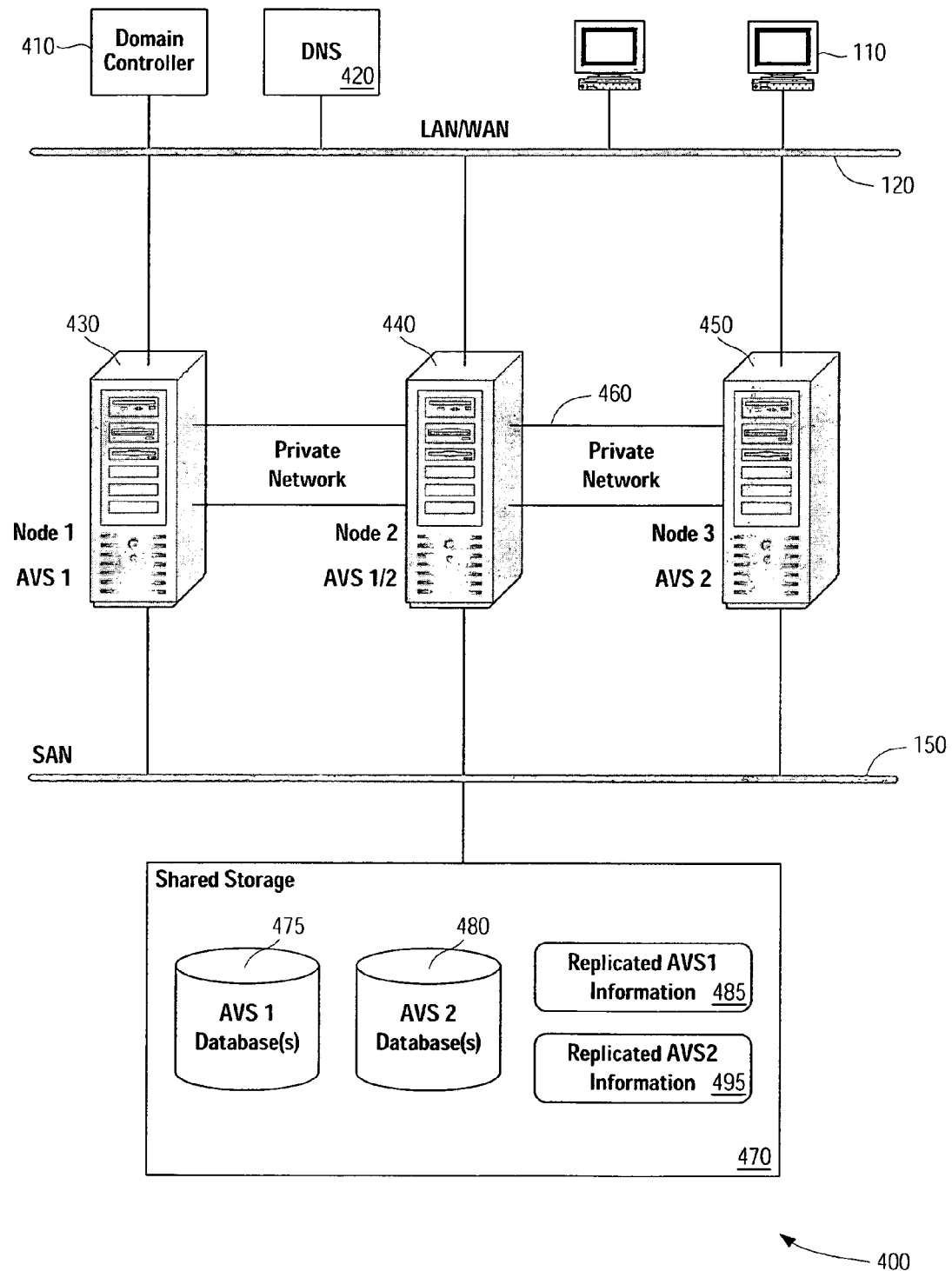
FIG. 4 is a simplified block diagram of a clustered computing system utilizing some of the systems and methods of the present invention.

FIG. 4 illustrates a cluster configuration that illustrates the extension of new cluster configurations to server applications such as Exchange 2000 Server. In many ways, cluster system 400 is similar to the cluster illustrated in FIG. 2. Cluster system 400 has several nodes (430, 440, and 450) interconnected with private network 460, as well as coupled to LAN/WAN 120 and SAN 150. LAN/WAN 120 allows various client computer systems 110 and other entities, e.g., domain controller 410 and domain name server 420 to communicate with the cluster nodes, while SAN 150 (or some other suitable interface as described above) allows nodes 430, 440, and 450 to all use shared storage 470 in furtherance of their clustered operation. Also as previously discussed, node 1 430 can be configured to operate as an instance of an application virtual server (AVS1) for a particular server application. In this example, node 3 450 is configured as a second instance of an application virtual server (AVS2), and node 2 440 is configured as a failover node for either node 1 430 or node 3 450. Thus node 2 440 can host either AVS1 or AVS2. Shared storage 470 includes data for both application virtual servers, e.g., databases(s) 470 and 480 and information (e.g., registry information, domain controller objects, etc.) 485 and 495.

This configuration illustrates one example of an any-to-any capability extended to a server application that otherwise does not support such a feature. In general, the any-to-any configuration can support many application virtual servers in the cluster, where each AVS is configured in a separate cluster service group. Each service group can fail over to any node in the cluster, provided that no other AVS is online on that node. In the example of cluster system 400, the virtual servers are configured in two service groups such that nodes 1 and 2 host the AVS1 service group, while nodes 2 and 3 host the AVS2 service group. If node 1 (or node 3) fails, the service group containing the AVS resources is failed over to node 2. This of course is a very simple example. In more a complex example, each of the two service groups includes all three nodes so that a failure on, for example, node one cause the virtual server to be failed over to node 2 or node 3, depending on a pre-arranged priority of nodes and depending on whether a virtual server is already operating on each of the nodes. Variations and extensions of this technique to greater numbers of nodes can be understood by those having ordinary skill in the art. In addition, since the techniques can be extended to server applications not specifically designed for the extend cluster functionality, it may be desirable or necessary to configure the server application for a particular type of "native" cluster environment, i.e., a mode of cluster operation for which it is designed to operate. For example, if the server application is Exchange 2000 Server, it may be desirable or necessary, e.g., for ease of later configuration, to initially configure the instance of Exchange 2000 Server for one of an active/active and an active/passive implementation.

Figure 5:
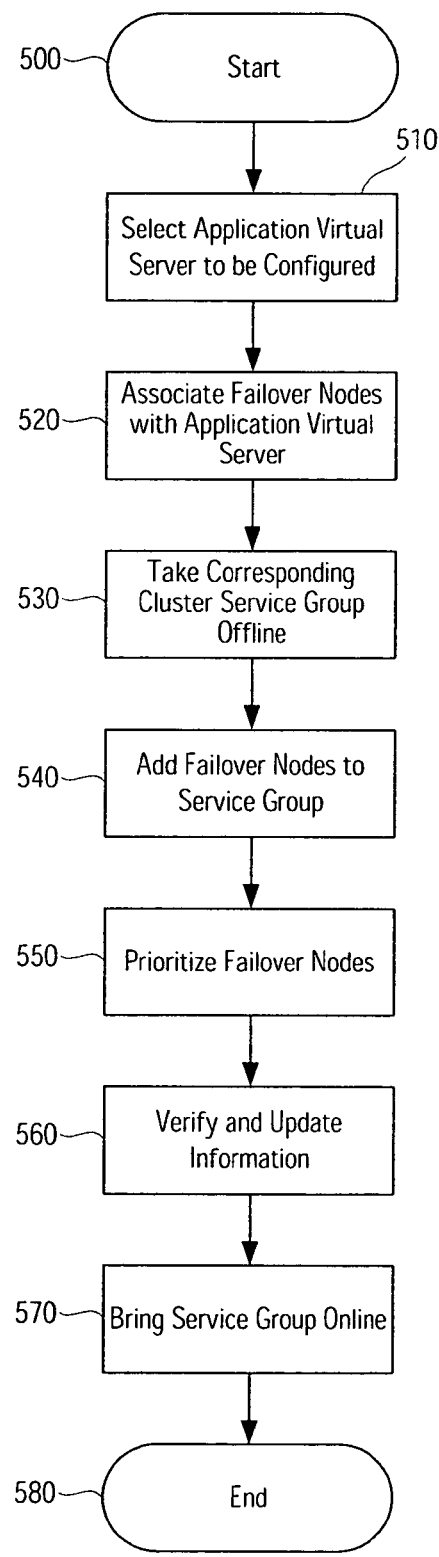
FIG. 5 is a flow chart illustrating techniques of the present invention.

FIG. 5 illustrates a process for configuring such any-to-any operation. In one embodiment, the process described in FIG. 5 (and FIG. 6 below) is performed by or in conjunction with an application specific cluster agent. Thus, some or all of the steps might be performed as agent configuration steps, as agent-related utility execution, or autonomously by an agent. In other embodiments where the clustering system does not implement agents as described herein, such steps may be replaced by configuration operations targeting clustering functionality that supports server applications generally, specific types of server applications, and/or specific server applications.

Configuration of a cluster operating one or more virtual servers begins at 500. The particular application virtual server, e.g., a particular instance of an Exchange virtual server, is selected (510). In general, there can be as many different virtual server instances as there are nodes. However, typical implementations will have n−1 virtual servers for a cluster having n nodes. Once the particular AVS to be configured is selected, operation transitions to 520 where one or more failover nodes are associated with the particular virtual server. This process can include additional operations such as verifying that each of the selected nodes is capable of hosting a virtual server. In a typical implementation, all available nodes are displayed for selection as well as those nodes that are currently being used as possible hosts for the virtual server.

Next the cluster service group corresponding to the particular virtual server for which failover nodes where associated in 520 is taken offline (530). This operation is typically performed because updates to a service group should be performed and propagated to all relevant nodes before the changes take effect. Once the service group is offline, the failover nodes are added to the service group as shown at 540. Since more than one failover node may exist, the order in which failover nodes are selected, i.e., the failover priority, can also be specified 550. All of the requested configuration changes are then verified and corresponding information updated (560). Once this task is complete, the service group can be brought back online (570) and the configuration process is complete (580). At this point, cluster operation can resume based on the new service group configuration and failover scheme.

Figure 6:
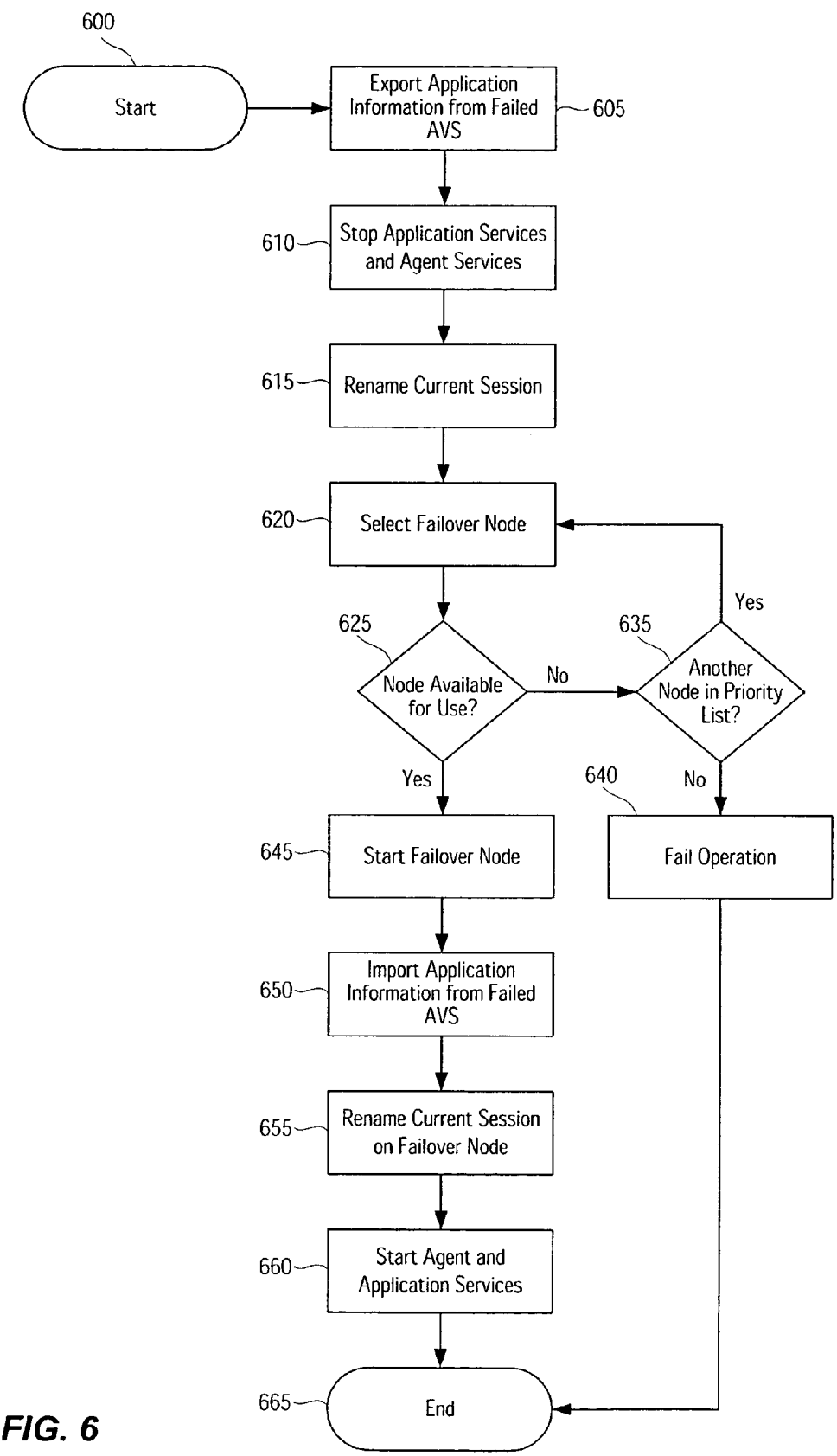
FIG. 6 is a flow chart illustrating techniques of the present invention.

FIG. 6 illustrates a virtual server failover process for a cluster configured for any-to-any failover operation. The process begins at 600 where some software entity, typically a server application specific cluster agent, has detected that one or more server application processes have failed and/or that the virtual server is no longer available. Note that other events, e.g., hardware failure, power loss, etc., can cause failover. These types of failover conditions, i.e., conditions that effect the entire node and not just a virtual server, are typically handled by core clustering services and/or general purpose agents. A description of such failover operations is beyond the scope of the present application.

Once a virtual server failover condition has been detected and the failover process initiated, operation transitions to 605 where certain server application information is exported from the failed application virtual server. For example, the node implementing the failed virtual server may include registry information indicating that various application services are being provided by that node. In the simplest example, exporting such information merely assures that the information is available to the possible failover nodes. In more complex examples, the export operation informs certain processes or entities on the node with the failed virtual server that the node will no longer be hosting the virtual server and/or providing services associated with the virtual server. For example, the export operation can explicitly remove service related information from a registry database. Next, any relevant application services and/or cluster agents are stopped (610). Since many applications include multiple services or processes, a failure of one or more of those, while being significant enough to prompt failover, may not immediately cause all related process or services to fail. Consequently, it is desirable to terminate any remaining related processes or services in a stateful manner. Similarly, a virtual server may make use of one or more general service agents that should be shutdown before the virtual server is transferred to a new node.

Since another node in the cluster will take over the virtual server (and ultimately take the virtual server's name and virtual IP address), the current session name on the node on which the virtual server has failed is renamed as shown at 615. The renaming process may give the current session name a new temporary name, perhaps indicative of the failure, or may simply use the computer name for the node. For example, in the context of Windows registry entries, the ActiveComputerName entry (HKEY_LOCAL_MACHINE\ SYSTEM\ CurrentControlSet\Control\ComputerName\Active ComputerName) before the failure is set to the name of the virtual server. In performing step 615, that entry's value is changed, for example, to the current value of ComputerName which is typically the computer system's name while ActiveComputerName represents the current session name.

Next in 620, the node that is to host the virtual server, i.e., the failover node is selected. In some cases there will be only one possible choice. In others, there may be multiple possible failover nodes and possibly a predetermined priority with which failover nodes are used. As noted above, the available node or nodes and any priority information are typically determined during a configuration process such as that illustrated in FIG. 5. Once a failover node is selected, operation transitions to 625 where it is determined if the selected node is available for use. In some cases the node may not be available or suitable for use, e.g., a virtual server is already being hosted by the selected failover node, some failure has occurred on the failover node, etc. If the selected failover node is not available, a determination is made (635) whether there is another node that can be selected. If so, operation returns to 620 where the new failover node is selected. If no other node is available, the virtual server failover procedure cannot be accomplished and the operation fails 640 (typically with some error indication) and terminates at 665.

Once an available node has been selected, the failover node is started (645). In some cases, the node will already be started, that is it is already operating as part of the cluster. Any information needed to operate as the virtual server is imported 650. In some cases, the information will be accessible to the failover node via shared storage. In other examples, the failed node may pass the information directly to the failover node. As noted above, a typical example of such information is server application registry information. In such an example, the importation process includes the process of making the information available as part of the failover node's registry. In step 655, the current session name (e.g., the aforementioned ActiveComputerName) for the failover node is renamed to have the virtual server name. This operation is performed so that users and client applications of the virtual server can redirect communication to the failover node in an efficient and well established fashion. Any agents and/or server application services are started in 660 thereby rendering the virtual server functional again on the failover node. The process terminates at 665.

The flow charts of FIGS. 3, 5, and 6 illustrate some of the many operational examples of the clusterizing and extended cluster features disclosed in the present application. Those having ordinary skill in the art will readily recognize that certain steps or operations illustrated in FIGS. 3, 5, and 6 can be eliminated or taken in an alternate order. Moreover, the methods described in FIGS. 3, 5, and 6 and many of the modules illustrated in FIG. 2 are typically implemented as one or more software programs for a computer system and are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Figure 1:
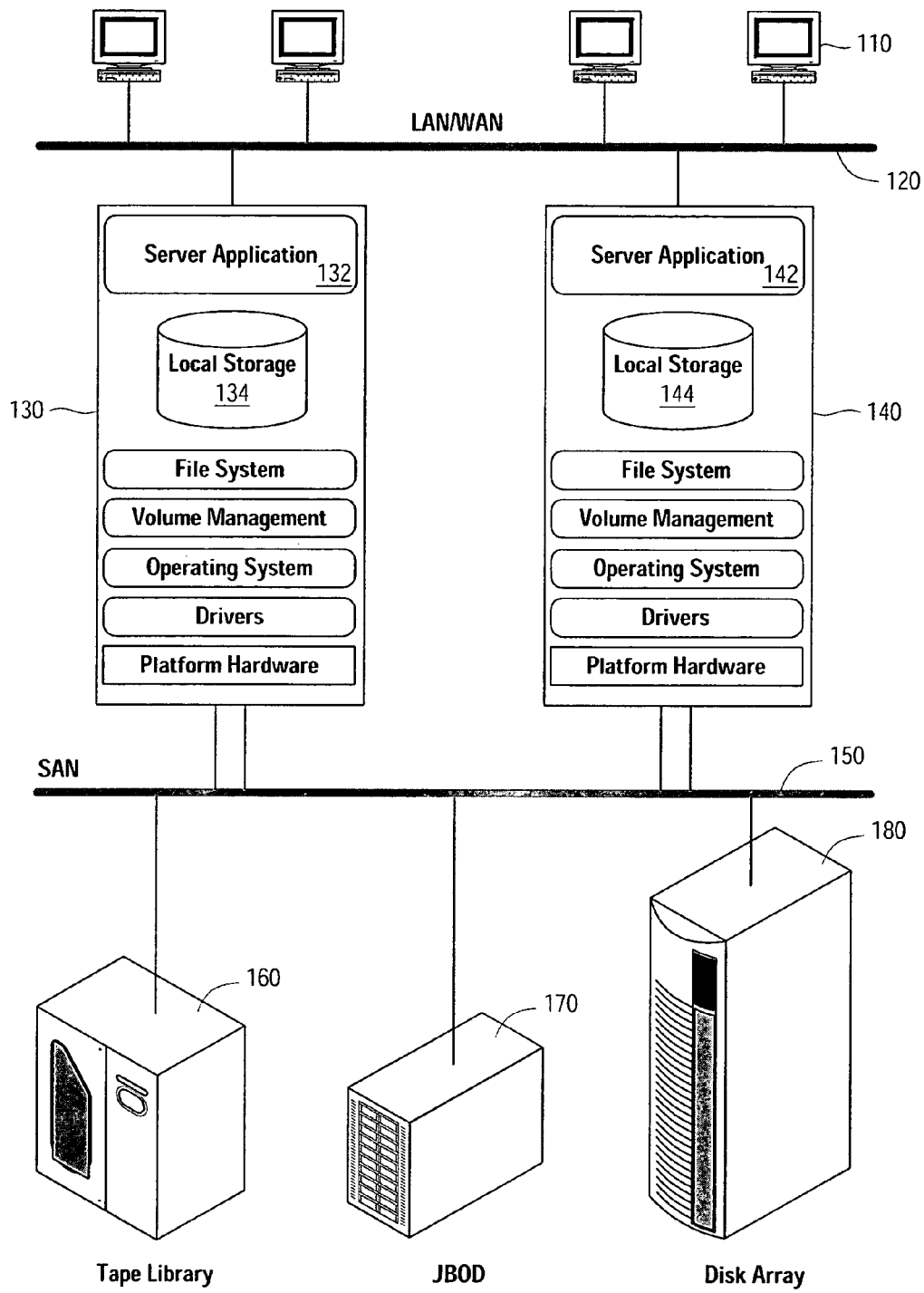
FIG. 1 is a simplified block diagram of a computing system.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources. The software can operate on host computer systems such as those illustrated in FIGS. 1 and 2, or may operation in storage appliances, switches, distributed virtualization environments (e.g., where certain virtualization tasks are performed by different devices), and the like.

Figure 7:
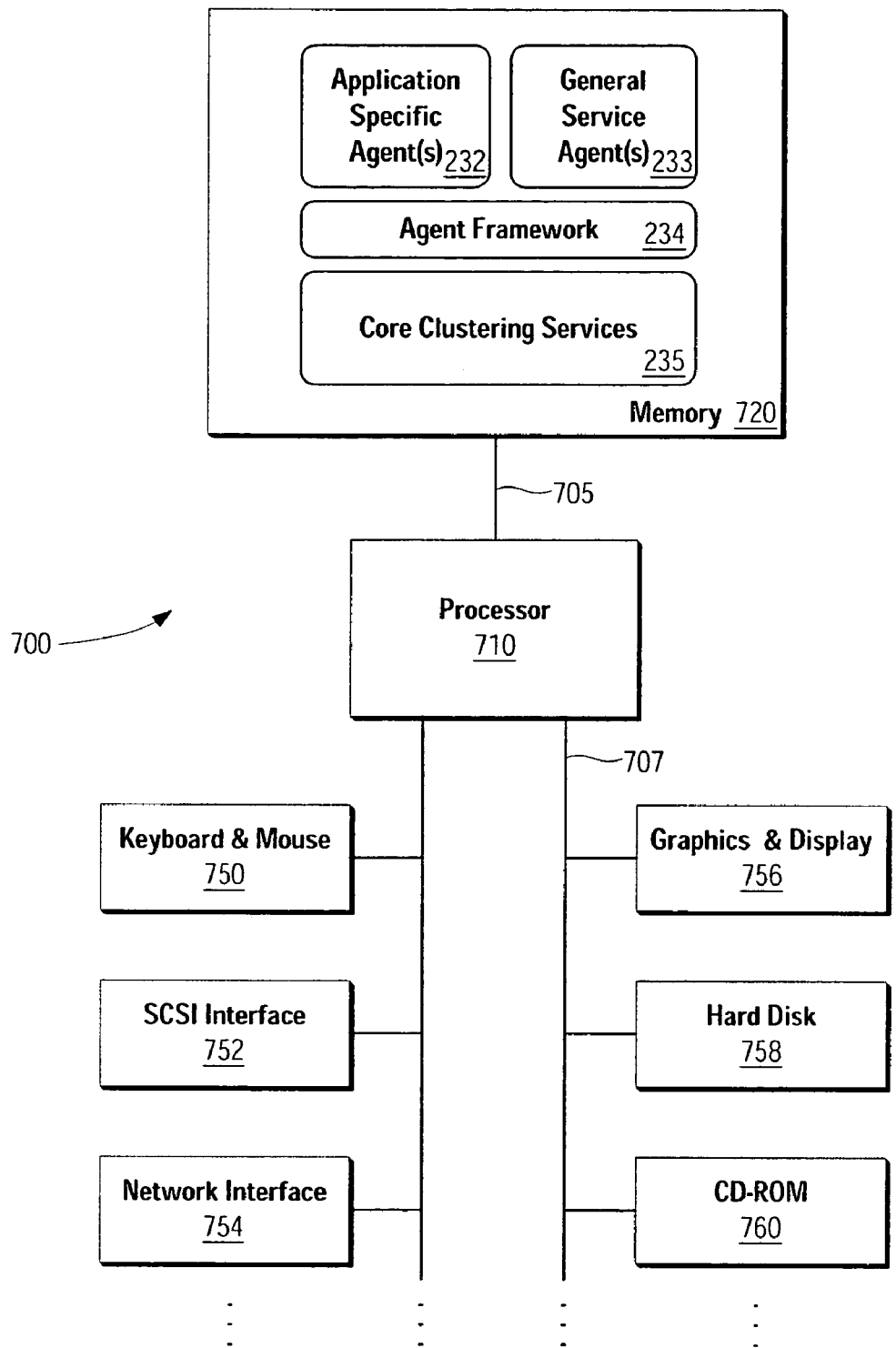
FIG. 7 is a block diagram of a computer system for implementing the techniques of the present invention.

FIG. 7 illustrates a block diagram of a computer system 700 for implementing the fencing techniques of the present invention. For example, computer system 700 can be an embodiment of one of the previously described hosts. Computer system 700 includes a processor 710 and a memory 720 coupled together by communications bus 705. Processor 710 can be a single processor or a number of individual processors working together. Memory 720 is typically random access memory (RAM), or some other dynamic storage device, and is capable of storing instructions to be executed by the processor, e.g., software 232, 233, 234, and 235 and its components. Memory 720 is also used for storing temporary variables or other intermediate information during the execution of instructions by the processor 710.

Those having ordinary skill in the art will readily recognize that the techniques and methods discussed below can be implemented in software using a variety of computer languages, including, for example, traditional computer languages such as assembly language, Pascal, and C; object oriented languages such as C++, C#, and Java; and scripting languages such as Perl and Tcl/Tk. Additionally, software 230 can be provided to the computer system via a variety of computer readable media including electronic media (e.g., flash memory), magnetic storage media (e.g., hard disk 758, a floppy disk, etc.), optical storage media (e.g., CD-ROM 760), and communications media conveying signals encoding the instructions (e.g., via a network coupled to network interface 754).

Computer system 700 also includes devices such as keyboard & mouse 750, SCSI interface 752, network interface 754, graphics & display 756, hard disk 758, and CD-ROM 760, all of which are coupled to processor 710 by communications bus 707. It will be apparent to those having ordinary skill in the art that computer system 700 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method comprising:
    changing a first name of a server computer system to a second name, wherein
        the server computer system has no clustering services installed when the changing is performed,
        the server computer system includes an operating system and a separate server application installed on the server computer system, and
        the server application is configured as a non-clustered standalone installation;
    installing cluster software on the server computer system, wherein
        the server application is already installed on the server computer system when the cluster software is installed,
        the installing the cluster software does not require reinstallation of the server application,
        the cluster software provides communications services,
        the cluster software allows the server computer system to operate as a node of a computer system cluster, and
        the cluster software communicates information indicating a state of at least one node in the computer system cluster using an intra-cluster communication protocol;
    installing a plurality of agents on the server computer system, wherein
        the plurality of agents act as intermediaries between resources and core clustering services, wherein the resources comprise hardware resources and software resources,
a first agent of the plurality of agents is a general service agent that controls the hardware resources, wherein
the hardware resources are monitored by the cluster software, and
a second agent of the plurality of agents is an application specific agent associated with the server application, wherein
the second agent provides the server application with any-to-any failover configuration information, and
the any-to-any failover configuration information comprises failover priority information,
creating a virtual server, wherein
the virtual server comprises the server computer system;
assigning the first name as a virtual server name of the virtual server; and
establishing a connection to the virtual server in response to receiving a request to establish a connection to the server application.

2. The method of claim 1 further comprising:
providing a virtual IP address corresponding to the virtual server.

3. The method of claim 2 wherein the server computer system includes a server computer first IP address, the method further comprising:
changing the server computer first IP address to a server computer second IP address, wherein the virtual IP address corresponding to the virtual server is the server computer first IP address.

4. The method of claim 2 further comprising:
transmitting the virtual IP address and virtual server name to at least one of a domain controller, a domain name server, and client computer system.

5. The method of claim 1 wherein the server computer system includes a storage device, and wherein the storage device stores server application data, the method further comprising:
transferring at least a portion of the server application data from the server computer system storage device to a cluster shared storage device.

6. The method of claim 1 wherein the server application is at least one of a communication server application, a collaboration server application, and e-mail server application, a web server application, a file server application, a database management system (DBMS), a media server application, and an enterprise application server.

7. The method of claim 1 further comprising:
determining whether the server computer system can operate as a cluster node.

8. The method of claim 1 further comprising:
installing a cluster agent on the server computer system, wherein the cluster agent is configured to specifically operate with the server application.

9. The method of claim 1 wherein:
the cluster comprises a plurality of nodes; and
each node is configured such that a cluster service group associated with an instance of the virtual server hosted on that node can fail over to any other node in the cluster, and wherein at least one other node of the plurality of nodes also hosts an instance of the virtual server.

10. A computer system having a first name, wherein
the first name is configured to be changed to a second name,
the server computer system has no clustering services installed when the first name is changed to the second name, and the computer system comprises:
a memory;
a processor coupled to the memory;
a local storage device coupled to the processor;
an operating system; and
a separate server application stored on the local storage device, wherein
the server application is initially configured as a non-clustered standalone installation;
cluster software configured to:
create a virtual server, wherein
the virtual server comprises the server computer system,
assign the first name as a virtual server name of the virtual server,
enable the server computer system to operate as a node of a computer system cluster,
establish a connection to the virtual server in response to receiving a request to establish a connection to the server application,
communicate with a plurality of agents, wherein
the plurality of agents are configured to act as intermediaries between resources and core clustering services, wherein
the resources comprise hardware resources and software resources,
a first agent of the plurality of agents is a general service agent that controls the hardware resource, wherein
the hardware resource monitored by the cluster software, and
a second agent of the plurality of agents is an application specific agent associated with the server application, wherein
the second agent provides the server application with any-to-any failover configuration information, and
the any-to-any failover configuration information comprises failover priority information,
the server application is already stored on the local storage device when the cluster software is installed,
installation of the cluster software does not require reinstallation of the server application,
installation of the cluster software comprises storing the cluster software on the local storage device,
the cluster software provides communications services,
the cluster software is configured to communicate information indicating the state of at least one node in the cluster using an intra-cluster communication protocol, and
at least a portion of at least one of the server application and the cluster software is encoded as instructions stored in the memory and executable on the processor.

11. The computer system of claim 10 further comprising:
installation software configured to install the cluster software on the computer system, wherein the cluster software is operable to allow the computer system to operate as a node of a computer system cluster.

12. The computer system of claim 10 wherein the cluster software is further configured to receive a virtual IP address corresponding to the virtual server.

13. The computer system of claim 12 further comprising:
a computer system first IP address; wherein the cluster software is further configured to change the computer system first IP address to a computer system second IP address, and wherein the virtual IP address corresponding to the virtual server is the computer system first IP address.

14. The computer system of claim 12 wherein the cluster software is further configured to:
  transmit the virtual IP address and virtual server name to at least one of a domain controller, a domain name server, and client computer system.

15. The computer system of claim 10 wherein the local storage devices stores server application data, and wherein the cluster software is further configured to:
  transfer at least a portion of the server application data from the computer system to a cluster shared storage device.

16. The computer system of claim 10 wherein the server application is at least one of a communication server application, a collaboration server application, and e-mail server application, a web server application, a file server application, a database management system (DBMS), a media server application, and an enterprise application server.

17. A non-transitory computer readable medium comprising program instructions executable on a processor, the computer readable medium being at least one of an electronic storage medium, a magnetic storage medium, and an optical storage medium, wherein
  the program instructions are executable to
    change a first name of a server computer system to a second name, wherein
      the server computer system has no clustering services installed when the first name is changed to the second name,
      the server computer system includes an operating system and a separate server application installed on the server computer system, and
    install cluster software, wherein
      installation of the cluster software does not require reinstallation of the server application,
  the cluster software is operable to
    create a virtual server associated with the server application, wherein
      the virtual server comprises the server computer system,
    assign the first name as a virtual server name of the virtual server,
    establish a connection to the virtual server in response to reception of a request to establish a connection to the server application, and
    communicate with a plurality of agents, wherein
      the plurality of agents are configured to act as intermediaries between resources and core clustering services, wherein
        the resources comprise hardware resources and software resources,
      a first agent of the plurality of agents is a general service agent configured to control the hardware resource, wherein
        the hardware resource monitored by the cluster software, and
      a second agent of the plurality of agents is an application specific agent associated with the server application, wherein
        the second agent provides the server application with any-to-any failover configuration information, and
        the any-to-any failover configuration information comprises failover priority information,
  the cluster software provides communications services, wherein
    the communication services communicate information indicative of the state of at least one node in the cluster using an intra-cluster communication protocol,
  the cluster software is configured to allow the server computer system to operate as a node of a computer system cluster, and
  the server application is already installed on the server computer system when the program instructions are executed.

18. The non-transitory computer readable medium of claim 17 further comprising program instructions operable to implement:
  installing the cluster software on the server computer system, wherein the cluster software is configured to allow the server computer system to operate as a node of a computer system cluster.

19. The non-transitory computer readable medium of claim 17 further comprising program instructions operable to implement:
  providing a virtual IP address corresponding to the virtual server.

20. The non-transitory computer readable medium of claim 19 wherein the server computer system includes a server computer first IP address, the computer readable medium further comprising program instructions operable to implement:
  changing the server computer first IP address to a server computer second IP address, wherein the virtual IP address corresponding to the virtual server is the server computer first IP address.

21. The non-transitory computer readable medium of claim 20 further comprising program instructions operable to implement:
  transmitting the virtual IP address and virtual server name to at least one of a domain controller, a domain name server, and client computer system.

22. The non-transitory computer readable medium of claim 17 wherein the server computer system includes a storage device, and wherein the storage devices stores server application data, the computer readable medium further comprising program instructions operable to implement:
  transferring at least a portion of the server application data from the server computer system storage device to a cluster shared storage device.

23. The non-transitory computer readable medium of claim 17 wherein the server application is at least one of a communication server application, a collaboration server application, and e-mail server application, a web server application, a file server application, a database management system (DBMS), a media server application, and an enterprise application server.

24. The non-transitory computer readable medium of claim 17 further comprising program instructions operable to implement:
  determining whether the server computer system can operate as a cluster node.

25. The non-transitory computer readable medium of claim 17 further comprising program instructions operable to implement:
  installing a cluster agent on the server computer system, wherein the cluster agent is configured to specifically operate with the server application.

26. An apparatus comprising:
  a means for changing a first name of a server computer system to a second name, wherein
    the server computer system has no clustering services installed when the first name is changed to the second name, the server computer system includes an operating system and a separate server application installed on the server computer system, and the server application is configured as a non-clustered standalone installation;

a means for installing cluster software on the server computer system, wherein the server application is already installed on the server computer system when the cluster software is installed, installation of the cluster software does not require reinstallation of the server application, the cluster software is configured to allow the server computer system to operate as a node of a computer system cluster, the cluster software is configured to communicate with a plurality of agents, wherein the plurality of agents are configured to act as intermediaries between resources and core clustering services, wherein the resources comprise hardware resources and software resources, a first agent of the plurality of agents is a general service agent configured to control the hardware resource, wherein the hardware resource is monitored by the cluster software, and a second agent of the plurality of agents is an application specific agent associated with the server application, wherein the second agent provides the server application with any-to-any failover configuration information, and the any-to-any failover configuration information comprises failover priority information, the cluster software provides communications services, and the cluster software is configured to communicate information indicating the state of at least one node in the cluster using an intra-cluster communication protocol; and a means for creating a virtual server associated with the server application, wherein the virtual server comprises the server computer system;

a means for assigning the first name as a virtual server name of the virtual server; and a means for establishing a connection to the virtual server in response to reception of a request to establish a connection to the server application.

27. The apparatus of claim 26 further comprising:
a means for providing a virtual IP address corresponding to the virtual server.

28. The apparatus of claim 27 wherein the server computer system includes a server computer first IP address, the apparatus further comprising:
a means for changing the server computer first IP address to a server computer second IP address, wherein the virtual IP address corresponding to the virtual server is the server computer first IP address.

29. The apparatus of claim 27 further comprising:
a means for transmitting the virtual IP address and virtual server name to at least one of a domain controller, a domain name server, and client computer system.

30. The apparatus of claim 26 wherein the server computer system includes a means for storing data, and wherein the means for storing data stores server application data, the apparatus further comprising:
a means for transferring at least a portion of the server application data from the server computer system means for storing data to a shared means for storing data.

31. The apparatus of claim 26 further comprising:
a means for determining whether the server computer system can operate as a cluster node.

* * * * *